Jan. 23, 1968      H. SCHIPPERS      3,364,523
SEAL PACKING FLUID SEALS FOR EXTRUSION MACHINES
Filed May 18, 1966

INVENTOR:
HEINZ SCHIPPERS
BY
Marzall, Johnston, Cook & Root
ATT'YS

United States Patent Office 3,364,523
Patented Jan. 23, 1968

3,364,523
SEAL PACKING FLUID SEALS FOR
EXTRUSION MACHINES
Heinz Schippers, Remscheid-Lennep, Germany, assignor to Barmer Maschinenfabrik Aktiengesellschaft, Wuppertal-Oberbarmen, Germany
Filed May 18, 1966, Ser. No. 551,127
Claims priority, application Germany, May 28, 1965, B 62,059
3 Claims. (Cl. 18—12)

ABSTRACT OF THE DISCLOSURE

Extrusion machines for extruding thermoplastics with vacuum drawn on feed section of screw housing and including rotating screw in cylindrical passage of screw housing; transmission drive; socket type cylindrical coupling connecting screw and drive; stationary seal housing about coupling with annular sealing liquid chamber surrounding socket of coupling; coaxial, closely spaced cylindrical sleeves in chamber about socket with screw threads of opposite hand on contiguous ends of sleeves; nut with screw thread portions of opposite hand threaded on threads of sleeves; set of packing rings at opposite ends of chamber, said sleeves pressing against respective sets of packing rings; collector ring in one set of packing rings closest to screw housing; short screw segment on head end of screw outside socket and inside sealing ring for urging forwardly any thermoplastic leaked past sealing ring; and collector passage for collecting and removing leaked thermoplastic thrust forwardly by screw segment.

Figure 1:
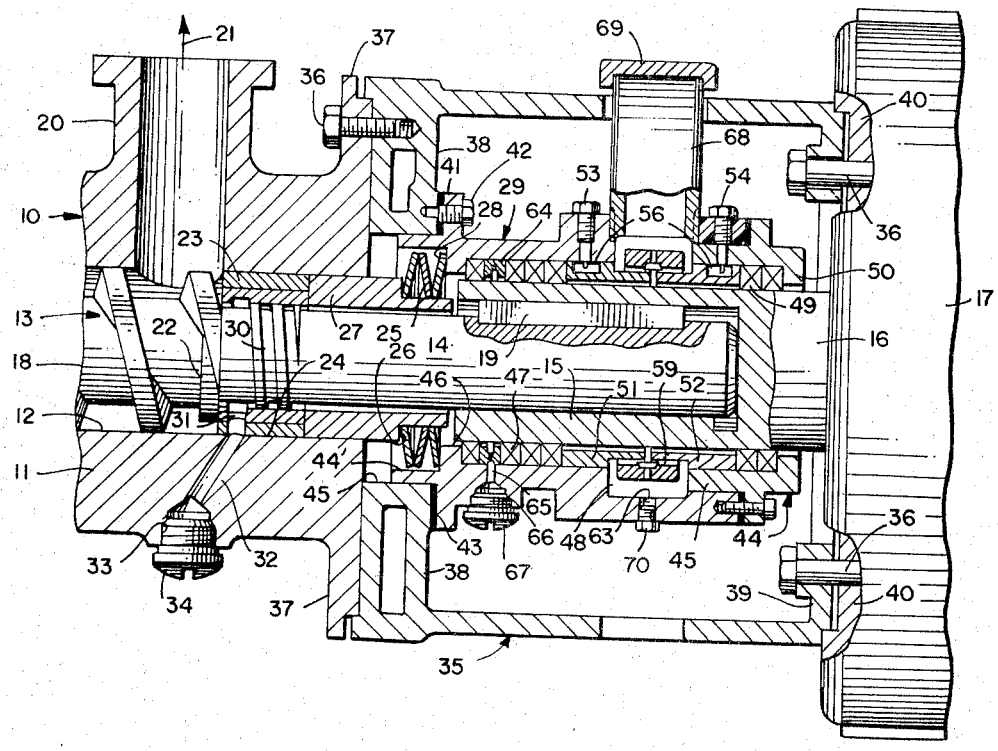

This invention, in general, relates to fluid seals about a rotary drive of a worm or screw of an extrusion machine. The invention is particularly useful in such extrusion machines for extruding thermoplastics wherein a vacuum is drawn on the feed section of the screw housing.

The packings heretofore commonly used with extrusion machines, such as gasket rings and sealing ring packings, are alone not sufficient to insure the production and maintenance of a vacuum in the feed section of the extrusion machine, i.e., on the feed end of the screw housing and/or its feed tube. In many fields, where particularly high demands are made on seal tightness, seals with sealing liquid are utilized. The latter seals require a construction adapted to the requirements of the special purposes of use. The primary object of this invention is to furnish a sealing liquid packing adapted to the present special requirements of an extrusion machine.

In accordance with the invention, a sealing fluid packing is provided between filler section of the screw housing and transmission housing for rotatably driving the screw. The sealing fluid packing is disposed in a seal housing surrounding the coupling between the transmission drive shaft and the screw shaft. This sealing fluid packing comprises a seal housing providing an annular chamber about the coupling. The annular chamber houses two nearly abutting, coaxial adapter sleeves or rings surrounding the drive coupling in a manner to permit axial movement while preventing rotation. The nearly abutting end of one sleeve or ring has an outer screw thread of left hand and the nearly abutting end of the other sleeve or ring has an outer screw thread of opposite, (right) hand. The sleeves or rings are slidable axially in opposite directions by rotating an adjusting nut spanning contiguous ends of the sleeves or rings and having screw threads of opposite hand threaded on the sleeve threads. The outer ends of the sleeves respectively press against packing rings in the seal housing. This particular construction of the sealing liquid packing with an extrusion machine assures that the seal rings which seal off opposite ends of the sealing liquid chamber have enough axial contact pressure to secure a substantially liquid-tight seal against both the drive shaft coupling the seal housing. Some adjustments, necessary from time to time, of the axial pressure of the outer ends of the adapter sleeves against both sealing ring packs take place simultaneously in both axial directions through simple rotation of the common adjusting nut.

Many of the media used as sealing liquid, upon their actual contact with the synthetic thermoplastics being extruded in the extrusion machine, are reactive with or detrimental to the synthetic thermoplastics. Hence, a sealing liquid which is neutral with respect to the thermoplastics is preferred. It is, therefore, recommended that a mineral oil be utilized as the sealing liquid. Regardless of the good sealing effect provided by the invention, traces of sealing liquid seep between the seal ring packing and the driving shaft coupling rotating relative thereto. The passage even of small quantities of the sealing liquid into the screw housing of the extrusion machine may be prevented by means of a collector ring disposed in the sealing ring pack which is closer to the screw housing. An outlet bore is provided in the seal housing for the carrying off of the sealing liquid collected in the collector ring.

Figure 2:
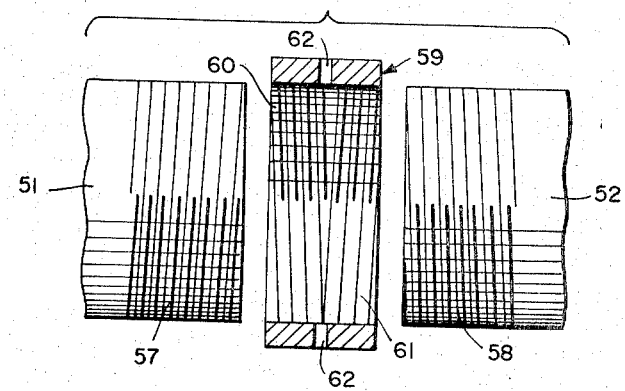

A preferred embodiment of the invention is illustrated in the drawing, wherein:

FIGURE 1 is a side elevation of a fragment of a rotary drive transmission housing, and diametric sections of a liquid seal member and the feed end of a screw extruder; and FIGURE 2 is an exploded view of the adapter nut and adapter sleeves.

Referring to the drawing, the screw extruder 10 comprises a screw housing 11 having a cylindrical passage 12 in which rotates the screw or worm 13. The head end 14 of the screw shaft extends into a socket 15 of the drive shaft 16 of the rotary drive transmission (not shown) in transmission housing 17. The spline 19 of socket 15 locks transmission drive shaft 16 to the head end 14 of screw drive shaft 18 and thereby provides a rotary drive coupling between said drive shafts.

Thermoplastic is fed into the feed end of screw housing 11 through feed tube 20. By a conventional vacuum device (not shown), a vacuum, indicated on the drawing by arrow 21, is drawn on the feed section of the screw housing 11.

The screw 13 has a rear, annular flange 22 which rotates against an edge of ring bushing 23 in the rear portion 24 of passage 12. The edge of bushing 23 and flange 22 are urged into rotary seal contact by a pack of conical disc springs 25, one side of which pack bears against annular shoulder 26 of a bushing sleeve 27 and the other end of which bears against an annular shoulder 28 on the seal housing 29. The bushing sleeve 27 urges, under the resilient pressure of springs 25, the edge of ring bushing 23 into sealing engagement with flange 22 to seal against flow of thermoplastic therebetween. Should, however, some thermoplastic leak through the rotary seal, the shaft 18 of the screw 13 has a short screw segment 30 with flights in close proximity to the inner side of ring bushing 23. The screw segment 30 urges any leaked thermoplastic forwardly toward an outlet hole 31 in the bottom of bushing 23. The outlet hole 31 communicates with a downwardly-extending passage 32 in screw housing 11. The lower end of passage 32 communicates with a tapped hole 33, which is normally closed off by the threaded plug 34. Plug 34 is withdrawn from time to time to discharge accumulated thermoplastic.

The screw housing 11 and the transmission housing 17 are rigidly joined by an intermediate housing 35 by means of a plurality of bolts 36 coupling rear annular flange 37 of screwing housing 11 to front flange 38 of housing 35 and coupling rear annular flange 39 of housing 35 to front wall 40 of the transmission housing 17. The front flange 41 of seal housing 29 is coupled by a plurality of bolts 42 to the radically inner portion of front annular flange 38 with a ring gasket 43 inserted. Cylindrical end 44' of seal housing 29 matingly fits into the inner cylindrical wall 45 of the flange 38.

The rear end of seal housing 29 has a ring shaped closure cap 44 bolted thereto. Its ring flange 45 extends into the rear opening of seal housing 29. The forward end of seal housing 29 has a ring lip 46 forming an annular shoulder against which bears the forward pack of packing rings 47. The larger diameter rear portion of seal housing 29 has, when closure cap 44 is mounted therein, an annular chamber 48, the latter adapted to contain the sealing liquid. A rear pack of sealing rings 49 are mounted in the space between the transmission shaft 16 and the rear portion of closure cap 44 and bear against the annular rear lip 50 of closure cap 44. The sealing rings 47 and 49 may be made of the usual materials, e.g., felt, asbestos, or spun or interwoven polytetrafluoroethylene.

Two adapter sleeves or rings 51 and 52 are non-rotatably and axially slidably mounted in seal housing 29 and its closure cap 44. This mounting is provided by bolts 53 and 54, which extend through the seal housing and closure cap, respectively. The ends of the shanks of said bolts having small pins fitted into narrow axial slots 56 in the respective adapter sleeves. The pins and slots prevent rotation of said sleeves but permit axial movements thereof.

The nearly abutting, contiguous ends of sleeves 51 and 52 have outer screw threads 57 and 58 of respective opposite hands. An adjusting nut 59 is internally threaded from the center outwardly with mating screw threads 60 and 61 of respective opposite hands. The nut 59 contains a plurality of radial bores 62 adapted to receive a pin of a tool (not shown) used to rotate the nut. Thus, rotation of adapter nut 59 spreads apart or draws together the sleeves 51 and 52, thereby increasing or decreasing the pressure of the opposite ends of the sleeves on the respective packs of sealing rings 47 and 49.

The pressure exerted in this manner on the sealing packings may at any time be adjusted easily and rapidly according to the particular requirements or adapted thereto, respectively. An ordinary security member, not shown, may be used to prevent further twisting or rotating of the adjusting nut. It may consist of a releasable spring-tongue fixed on the sealing housing 29, which engages in corresponding notches or grooves on the adjusting nut 59. When desired, the sealing liquid in the chamber 48 may be drained through the tapped outlet opening 63 upon removal of the threaded plug 70.

Between the sealing rings 47 of the front seal packing is disposed a collector ring 64 for the collecting of the sealing liquid which has leaked along the drive shaft coupling. Several radial bore-holes are distributed on the periphery of the collector ring 64 and permit the passage of the leaking fluid through the collector ring. The fluid flows by gravity through the outlet passage 65 and the evacuation opening 66. The evacuation opening 66 is closed with a threaded plug 67, which may be provided with a peephole or sighting tube, in order to be able to observe the quantity of the leaking fluid. In case the quantity of sealing liquid trickling through is found too large, the sealing packings may thereupon be compressed further by turning the adjusting nut 59.

The tube 68 is threaded into the seal housing 29 and is provided for filling the liquid chamber with sealing liquid and for the control of the level of the liquid. Tube 68 and chamber 48 are closed by means of the screw cap 69.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. In a machine for extrusion of thermoplastics by a rotating screw in a cylindrical passage of a screw housing, said machine having vacuum means for drawing a vacuum on the feed section thereof into which thermoplastic is fed, and a transmission drive, and rotatable, cylindrical coupling means operatively connecting said screw and said drive, the improvement comprising a stationary seal housing about said coupling means, means in said housing defining an annular sealing liquid chamber facing said coupling means, a pair of closely spaced, coaxial, cylindrical sleeves surrounding said coupling means in said chamber, means limiting movement of said sleeves to movement in the axial directions relative to said housing, screw threads of opposite hand on respective, contiguous ends of said sleeves, a nut having screw thread portions of opposite hand respectively threaded on said screw threads of said sleeves, a set of packing rings in respective opposite axial ends of said chamber, and respective opposite ends of said sleeves pressing against respective sets of packing rings to compress said packing rings and form substantially fluid tight contact between said rings and said coupling means.

2. In a machine as claimed in claim 1, a collector ring interposed in said packing rings closest to said screw housing, and passage means in said seal housing for draining sealing liquid collected in said collector ring.

3. A machine as claimed in claim 1 wherein said coupling means comprises a drive shaft with a cylindrical socket, said chamber surrounding said socket and said packing rings being in substantially fluid tight contact with the cylindrical wall of said socket, a head end of said rotating screw splined in said socket, seal ring means sealing said head end of said screw at said feed section, a short screw segment on said head end outside said socket and inside said ring means for urging toward said feed section any thermoplastic material leaked past said ring means, and means for collecting and removing the leaked thermoplastic from said ring means.

References Cited

UNITED STATES PATENTS

| | | | |
|---|---|---|---|
| 1,337,227 | 4/1920 | Hoffman | 285—32 |
| 2,217,686 | 10/1940 | Kreher | 277—108 X |
| 2,436,514 | 2/1948 | Jennings | 277—64 X |
| 2,565,923 | 8/1951 | Hrdlicka | 277—64 |
| 2,929,646 | 3/1960 | Smith | 277—64 |
| 3,067,462 | 12/1962 | Kullgren. | |
| 3,101,199 | 8/1963 | Hartnagel | 227—69 X |
| 3,110,060 | 11/1963 | Rengert. | |
| 3,164,388 | 11/1965 | Ellis | 227—18 |
| 3,204,294 | 9/1965 | Brochetti | 18—12 X |

FOREIGN PATENTS 882,294   11/1961   Great Britain.

WILLIAM J. STEPHENSON, *Primary Examiner.*

UNITED STATES PATENT OFFICE
CERTIFICATE OF CORRECTION

Patent No. 3,364,523 January 23, 1968

Heinz Schippers

It is certified that error appears in the above identified patent and that said Letters Patent are hereby corrected as shown below:

Column 4, line 64, "11/1965" should read -- 1/1965 --; line 68, "882,294" should read -- 882,403 --.

Signed and sealed this 25th day of November 1969.

(SEAL)
Attest:

Edward M. Fletcher, Jr.　　　　　　　　　　WILLIAM E. SCHUYLER, JR.
Attesting Officer　　　　　　　　　　　　　　　　Commissioner of Patents